(12) United States Patent
Hosotani

(10) Patent No.: US 11,101,696 B2
(45) Date of Patent: Aug. 24, 2021

(54) WIRELESS POWER FEEDING SYSTEM, WIRELESS POWER TRANSMITTER, AND WIRELESS POWER RECEIVER

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 246 days.

(21) Appl. No.: 16/180,993

(22) Filed: Nov. 5, 2018

(65) Prior Publication Data

US 2019/0074726 A1 Mar. 7, 2019

Related U.S. Application Data

(63) Continuation of application No. PCT/JP2017/020544, filed on Jun. 2, 2017.

(30) Foreign Application Priority Data

Jun. 6, 2016 (JP) .............................. JP2016-112335

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC .............. H02J 50/12; H02J 50/80; H02J 7/025
(Continued)

(56) References Cited

U.S. PATENT DOCUMENTS 5,864,302 A * 1/1999 Kokubu ............. G06K 19/0723
340/10.5
2009/0284082 A1 11/2009 Mohammadian
(Continued)

FOREIGN PATENT DOCUMENTS

CN 102843170 A 12/2012
JP H09-121182 A 5/1997
(Continued)

OTHER PUBLICATIONS

International Search Report issued in PCT/JP2017/020544; dated Jul. 25, 2017.
(Continued)

*Primary Examiner* — Hal Kaplan
*Assistant Examiner* — Swarna N Chowdhuri
(74) *Attorney, Agent, or Firm* — Studebaker & Brackett PC

(57) ABSTRACT

A transmitter has a transmitting resonant circuit, a transmitting circuit that supplies high-frequency power to the transmitting resonant circuit, and a demodulator. A receiver has a receiving resonant circuit; a receiving circuit that converts high-frequency power received by the resonant circuit into DC power; a load circuit that consumes the DC power; a resonance modulator that varies an input impedance, viewed toward the load circuit from the transmitting circuit, to switch whether an electromagnetic resonance condition is established; and a transmission-signal controller that converts a transmission signal into a variation pattern, representing a pattern of variation per predetermined time period of the input impedance, to control the resonance modulator. The demodulator detects a variable that varies with whether the electromagnetic resonance condition is established, and demodulates the transmission signal based on a pattern of
(Continued)

variation per predetermined time period with respect to temporal variation of the variable.

20 Claims, 15 Drawing Sheets

(58) Field of Classification Search
USPC .......................................................... 307/104
See application file for complete search history.

(56) References Cited

U.S. PATENT DOCUMENTS

| | | | | |
|---|---|---|---|---|
| 2012/0038220 A1* | 2/2012 | Kim | ................ | H04B 5/0037 |
| | | | | 307/104 |
| 2012/0235636 A1* | 9/2012 | Partovi | ................. | H02J 5/005 |
| | | | | 320/108 |
| 2012/0328043 A1* | 12/2012 | Kwon | ................ | H04B 5/0081 |
| | | | | 375/295 |
| 2013/0027078 A1* | 1/2013 | Nakano | ................. | H02J 7/025 |
| | | | | 324/764.01 |
| 2015/0303995 A1* | 10/2015 | Staring | ................ | H04B 5/0031 |
| | | | | 307/104 |
| 2016/0072307 A1* | 3/2016 | Kato | ....................... | H02J 50/12 |
| | | | | 307/104 |
| 2016/0094052 A1* | 3/2016 | Nago | ................. | H04B 5/0031 |
| | | | | 307/104 |
| 2017/0093167 A1* | 3/2017 | Von Novak, III | .. | H02J 7/00034 |
| 2017/0093168 A1* | 3/2017 | Von Novak, III | ...... | H02J 50/80 |
| 2017/0229920 A1* | 8/2017 | Joye | .................... | H04B 5/0031 |
| 2018/0138759 A1* | 5/2018 | Onishi | ................ | H02J 7/00034 |
| 2018/0152041 A1* | 5/2018 | Onishi | .................. | H01M 10/44 |
| 2018/0342899 A1* | 11/2018 | Joye | ........................ | H02J 50/12 |

FOREIGN PATENT DOCUMENTS

| | | |
|---|---|---|
| JP | 2011-205867 A | 10/2011 |
| JP | 2013-009373 A | 1/2013 |
| JP | 2013153636 A | 8/2013 |
| JP | 2014-030342 A | 2/2014 |
| JP | 2016-059115 A | 4/2016 |
| WO | 2013/042570 A1 | 3/2013 |

OTHER PUBLICATIONS

Written Opinion issued in PCT/JP2017/020544; dated Jul. 25, 2017.
An Office Action; "Notification of Reasons for Refusal," Mailed by the Japanese Patent Office dated Oct. 1, 2019, which corresponds to Japanese Patent Application No. 2018-522448 and is related to U.S. Appl. No. 16/180,993; with English language translation.
An Office Action mailed by China National Intellectual Property Administration dated Mar. 26, 2021, which corresponds to Chinese Patent Application No. 201780021062.2 and is related to U.S. Appl. No. 16/180,993; with English language translation.
An Office Action mailed by the Japanese Patent Office dated Mar. 10, 2020, which corresponds to Japanese Patent Application No. 2018-522448 and is related to U.S. Appl. No. 16/180,993.
An Office Action; "Notice of Reasons for Refusal," mailed by the Japanese Patent Office dated Jun. 15, 2021, which corresponds to Japanese Patent Application No. 2018-522448 and is related to U.S. Appl. No. 16/180,993 with English language translation.

* cited by examiner

FIG. 12

```
FIRST DATA    0 1 0 0 0 0
SECOND DATA   0 0 0 0 1 0
            ─────────────
       OR     0 1 0 0 1 0
```

WIRELESS POWER FEEDING SYSTEM, WIRELESS POWER TRANSMITTER, AND WIRELESS POWER RECEIVER

CROSS-REFERENCE TO RELATED APPLICATIONS

This application claims benefit of priority to International Patent Application No. PCT/JP2017/020544, filed Jun. 2, 2017, and to Japanese Patent Application No. 2016-112335, filed Jun. 6, 2016, the entire contents of each are incorporated herein by reference.

BACKGROUND

Technical Field

The present disclosure relates to a wireless power feeding system that wirelessly feeds high-frequency power from a transmitter to a receiver, and a wireless power transmitter and a wireless power receiver that constitute the wireless power feeding system.

Background Art

In a wireless power feeding system that wirelessly feeds power from a power transmitter to a power receiver by means of magnetic field coupling, the power transmitter includes a transmitting coil, and the power receiver includes a receiving coil. International Publication No. 2013/042570 discloses a configuration of such a wireless power feeding system in which the transmitting coil and the receiving coil are also used for signal transmission.

In the wireless power feeding system disclosed in International Publication No. 2013/042570 mentioned above, a resonant-frequency varying circuit connected to the receiving coil modulates the resonant frequency of a resonant circuit to thereby superimpose a load-modulated signal on a carrier wave, and a detector circuit of the transmitter detects the modulated signal to thereby receive a signal from the receiver. The transmitter controls supplied power appropriately in accordance with the signal received from the receiver.

SUMMARY

In a wireless power feeding system, fluctuations in characteristics such as the position of the receiver relative to the transmitter, the strength of coupling between the transmitting coil and the receiving coil, the power consumed by the load, and the voltage input to the transmitter cause corresponding fluctuations in the amplitude, phase, or other characteristics of the resonant voltage of the resonant circuit at the transmitter. In this case, a simple amplitude shift keying (ASK) or phase shift keying (PSK) scheme, which is based on the assumption that the state of the transmitter and the receiver is steady, is greatly affected by the above-mentioned fluctuations and thus unable to provide reliable signal transmission.

Each of the above-mentioned characteristics, such as the strength of magnetic coupling, the state of the load, and input voltage, varies independently. Therefore, if it is not possible to fix such a characteristic to a unique value, a very complicated and sophisticated control is required to achieve reliable signal transmission.

Accordingly, the present disclosure provides a wireless power feeding system that enables reliable signal transmission from the receiver to the transmitter, substantially without dependence on the state of the transmitter and the receiver, and a wireless power transmitter and a wireless power receiver that constitute the wireless power feeding system.

The present disclosure provides a wireless power feeding system including a transmitter having a transmitting resonant circuit including a transmitting coil, and a transmitting circuit that supplies high-frequency power to the transmitting resonant circuit; and a receiver having a receiving resonant circuit including a receiving coil, the receiving resonant circuit being capable of magnetically coupling to the transmitting resonant circuit, a receiving circuit that converts high-frequency power received by the receiving resonant circuit into direct-current power, and a load circuit that consumes the direct-current power. The receiver also includes a resonance modulation circuit that varies an input impedance to switch whether an electromagnetic resonance condition is established. The input impedance is an impedance viewed toward the load circuit from the transmitting circuit, and the electromagnetic resonance condition is a condition for electromagnetic resonance to be established by electromagnetic coupling between the transmitting resonant circuit and the receiving resonant circuit. The receiver further includes a transmission-signal control circuit that converts a transmission signal into a variation pattern to control the resonance modulation circuit. The variation pattern represents a pattern of variation in an electrical signal per predetermined time period with respect to temporal variation of the input impedance. The transmitter also includes a demodulator circuit that detects a variable and performs demodulation of the transmission signal. The variable varies in accordance with whether the electromagnetic resonance condition is established, and the demodulation is performed based on a variation pattern representing a pattern of variation per predetermined time period with respect to temporal variation of the variable.

The above-mentioned configuration enables easy determination of whether the condition for electromagnetic coupling between the transmitting resonant circuit and the receiving resonant circuit is established, that is, whether the electromagnetic resonance condition is established. This ensures highly stable signal transmission from the receiver to the transmitter, even when the resonant voltage of the transmitting resonant circuit fluctuates in amplitude or phase due to unsteady state of the transmitter and the receiver. The electromagnetic resonance condition is a condition in which an imaginary part of the input impedance at an operating frequency of the transmitting circuit is near zero and a magnitude of the input impedance is near local minimum.

The demodulator circuit performs the demodulation by, for example, comparison of the variable with a threshold. For example, the demodulator circuit compares the variable with a threshold, and converts the variable into a binary signal. This allows the variable to be handled as a signal suited for a logic circuit, thus facilitating demodulation of the transmission signal.

The variable is, for example, a quantity related to a current flowing through the transmitting circuit. Since the current that flows through the transmitting circuit varies in accordance with whether the electromagnetic resonance condition is established, the demodulator circuit performs demodulation based on the variation in the current.

The variable is, for example, a quantity related to a resonant voltage generated in the transmitting resonant circuit. Since the resonant voltage generated in the transmitting resonant circuit varies in accordance with whether the electromagnetic resonance condition is established, the demodulator circuit performs demodulation based on the variation in the resonant voltage.

The variable may be, for example, both of a quantity related to a current flowing through the transmitting circuit and a quantity related to a resonant voltage generated in the transmitting resonant circuit. This increases the accuracy of demodulation.

In any one of the configurations mentioned above, the demodulator circuit may perform the demodulation by comparison of the variable with a first threshold and a second threshold, the first threshold being used to detect a variation in the variable in a positive direction, the second threshold being used to detect a variation in the variable in a negative direction. This helps increase transfer rate for the transmission signal.

Also in any one of the configurations mentioned above, preferably, the receiving resonant circuit has a resonant capacitor that resonates together with the receiving coil, and the resonance modulation circuit has a variable capacitance circuit that varies the capacitance of the resonant capacitor. Consequently, whether the electromagnetic resonance condition is established can be switched easily by controlling the capacitance of the variable capacitance circuit.

The variable capacitance circuit is, for example, a connection circuit formed by a connection of a capacitor and a switching circuit. Consequently, whether the electromagnetic resonance condition is established can be switched easily by controlling the switching of the switching circuit.

The switching circuit is preferably a circuit including a semiconductor transistor. This enables fast switching of whether the electromagnetic resonance condition is established, thus increasing transfer rate for the transmission signal.

According to the present disclosure, there is provided a wireless power transmitter that constitutes a wireless power feeding system together with a wireless power receiver. The wireless power receiver includes a receiving resonant circuit capable of electromagnetically coupling to a transmitting resonant circuit included in the wireless power transmitter, a receiving circuit that converts high-frequency power received by the receiving resonant circuit into direct-current power, a load circuit that consumes the direct-current power, and a resonance modulation circuit that varies an input impedance to switch whether an electromagnetic resonance condition is established. The input impedance is an impedance viewed toward the load circuit from a transmitting circuit included in the transmitting resonant circuit, and the electromagnetic resonance condition is a condition for electromagnetic resonance to be established by electromagnetic coupling between the transmitting resonant circuit and the receiving resonant circuit. The wireless power receiver also includes a transmission-signal control circuit that converts a transmission signal into a variation pattern to control the resonance modulation circuit. The variation pattern represents a pattern of variation per predetermined time period with respect to temporal variation of the input impedance. Also, the wireless power transmitter includes a transmitting circuit that supplies high-frequency power to the transmitting resonant circuit; and a demodulator circuit that detects a variable and performs demodulation of the transmission signal. The variable varies in accordance with whether the electromagnetic resonance condition is established, and the demodulation is performed based on a variation pattern representing a pattern of variation per predetermined time period with respect to temporal variation of the variable.

The above-mentioned configuration ensures highly stable signal transmission from the receiver to the transmitter, even when the resonant voltage of the transmitting resonant circuit fluctuates in amplitude or phase due to unsteady state of the transmitter and the receiver.

The present disclosure also provides a wireless power receiver that constitutes a wireless power feeding system together with a wireless power transmitter. The wireless power transmitter includes a transmitting resonant circuit capable of electromagnetically coupling to a receiving resonant circuit included in the wireless power receiver, a transmitting circuit that supplies high-frequency power to the transmitting resonant circuit, and a demodulator circuit that detects a variable and performs demodulation of a transmission signal. The variable varies in accordance with whether an electromagnetic resonance condition is established, and the electromagnetic resonance condition is a condition for electromagnetic resonance to be established by electromagnetic coupling between the transmitting resonant circuit and the receiving resonant circuit. The demodulation is performed based on a variation pattern representing a pattern of variation per predetermined time period with respect to temporal variation of the variable. The wireless power receiver includes a receiving circuit that converts high-frequency power received by the receiving resonant circuit into direct-current power; a load circuit that consumes the direct-current power; and a resonance modulation circuit that varies an input impedance to switch whether the electromagnetic resonance condition is established. The input impedance is an impedance viewed toward the load circuit from the transmitting circuit included in the transmitting resonant circuit. The wireless power receiver further includes a transmission-signal control circuit that converts a transmission signal into a variation pattern to control the resonance modulation circuit. The variation pattern represents a pattern of variation per predetermined time period with respect to temporal variation of the input impedance.

The above configuration ensures highly stable signal transmission from the receiver to the transmitter, even when the resonant voltage of the transmitting resonant circuit fluctuates in amplitude or phase due to unsteady state of the transmitter and the receiver.

The present disclosure thus provides a wireless power feeding system that enables highly stable signal transmission from the receiver to the transmitter, substantially without dependence on the state of the transmitter and the receiver, and a wireless power transmitter and a wireless power receiver that constitute the wireless power feeding system.

BRIEF DESCRIPTION OF THE DRAWINGS

FIG. 12 illustrates exemplary processing performed by a control circuit included in a transmitter of the wireless power transmitter according to the third embodiment;

DETAILED DESCRIPTION

Hereinafter, a plurality of embodiments of the present disclosure will be described by way of several specific examples with reference to the drawings. Throughout the drawings, the same reference signs are used to designate the same parts or elements. Although a number of discrete embodiments are described below for the convenience of easy explanation or understanding of the main features of the disclosure, partial substitutions or combinations of features or configurations described in different embodiments are possible. For the second and subsequent embodiments, a repetitive description will not be given of matters identical to those of the first embodiment, and only differences from the first embodiment will be described. In particular, the same or similar operational effects provided by the same or similar features or configurations will not be mentioned for each individual embodiment.

First Embodiment

Figure 1:
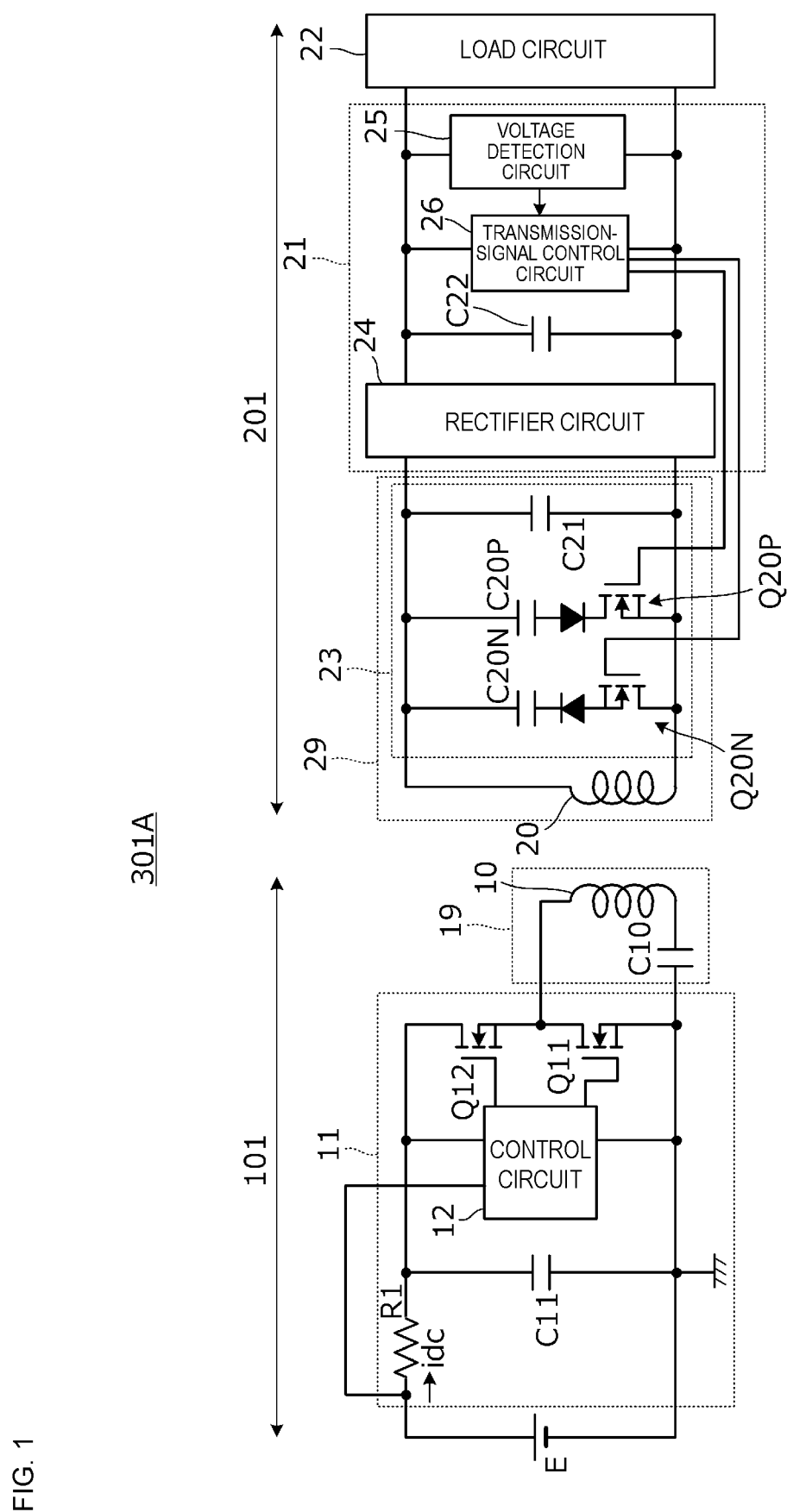
FIG. 1 is a circuit diagram according to a first embodiment, illustrating a wireless power transmitter, a wireless power receiver, and a wireless power feeding system including the wireless power transmitter and the wireless power receiver.

FIG. 1 is a circuit diagram according to a first embodiment, illustrating a wireless power transmitter, a wireless power receiver, and a wireless power feeding system including the wireless power transmitter and the wireless power receiver.

A wireless power feeding system 301A includes a wireless power transmitter 101, and a wireless power receiver 201. The wireless power transmitter (to be referred to as simply "transmitter" hereinafter) 101 has a transmitting resonant circuit 19, and a transmitting circuit 11. The transmitting resonant circuit 19 includes a transmitting coil 10, and a resonant capacitor C10. The transmitting circuit 11 supplies high-frequency power to the transmitting coil 10. The wireless power receiver (to be referred to as simply "receiver" hereinafter) 201 has a receiving coil 20, a receiving resonant circuit 29, a receiving circuit 21, and a load circuit 22. The receiving coil 20 electromagnetically couples to the transmitting coil 10. The receiving resonant circuit 29 includes the receiving coil 20, and a resonant capacitor C21. The receiving circuit 21 converts high-frequency power received by the receiving coil 20 into direct-current (DC) power. The load circuit 22 consumes the DC power.

The transmitting resonant circuit 19 and the receiving resonant circuit 29 electromagnetically couple to each other. During this electromagnetic coupling, the transmitting resonant circuit 19 and the receiving resonant circuit 29, which are located at a distance from each other, act upon each other due to magnetic coupling, electric field coupling, or a composite thereof. Consequently, the magnetic and electric field energies of the respective resonant circuits are combined with each other and exchanged, thus generating vibration.

In the transmitting resonant circuit 19, mainly the transmitting coil 10 and the transmitting resonant capacitor C10 exchange their respective magnetic field energy and electric field energy, and electrical vibration is generated as a result.

Likewise, in the receiving resonant circuit 29, mainly the receiving coil 20 and the resonant capacitor C21 exchange their respective magnetic field energy and electric field energy, and electrical vibration is generated as a result. Electromagnetic resonance is established when an electromagnetic resonance condition is satisfied by these components.

The receiver 201 includes a resonance modulation circuit 23. The resonance modulation circuit 23 varies the input impedance as viewed toward the load circuit 22 from the transmitting circuit 11 to thereby switch whether the electromagnetic resonance condition is established. The switching between establishing and non-establishing of the electromagnetic resonance condition by the resonance modulation circuit is preferably slower than switching of the transmitter and faster than changing of the state of the transmitter and the receiver.

The receiver 201 has a transmission-signal control circuit 26. The transmission signal control circuit 26 controls the resonance modulation circuit 23 by converting a transmission signal into a variation pattern representing a pattern of variation per predetermined time period with respect to temporal variation in the input impedance.

When the electromagnetic resonance condition is established, the imaginary part of the input impedance as viewed toward the load circuit from the transmitting circuit 11 (i.e., the input impedance at the switching frequency, as viewed toward the receiving side from the transmitting side) is near zero or near infinity. When the electromagnetic resonance condition is not established, the imaginary part of the input impedance has a certain value.

The transmitter 101 has a demodulator circuit that determines whether the electromagnetic resonance condition is established, and demodulates, into a transmission signal, a pattern of variation per predetermined time period with respect to temporal variation of the determination result. By using, for signal transmission, a variation pattern per predetermined time period, a signal can be transmitted in a stable manner even when the state of the transmitter and the receiver is unsteady.

The transmitting circuit 11 includes switching circuits Q11 and Q12, a control circuit 12, a current detection resistor R1, and capacitors C10 and C11. The control circuit 12 drives the switching circuits Q11 and Q12 on and off. The transmitting coil 10 and the capacitor C10 constitute the transmitting resonant circuit 19. The capacitor C11 stabilizes input voltage, and also suppresses the harmonic components of voltage and current. The control circuit 12 controls the switching of the switching circuits Q11 and Q12 so that a resonant current flows through the transmitting resonant circuit 19.

A DC input current idc supplied from an input power source E to the transmitting circuit 11 flows through the current detection resistor R1. The control circuit 12 reads the voltage dropped across the current detection resistor R1 to detect the DC input current idc supplied from the input power source E.

The transmitting resonant circuit 19 has a resonant frequency f0 suitable for the purpose of power feeding. For example, the resonant frequency f0 is not less than 6 MHz and not more than 14 MHz (i.e., from 6 MHz to 14 MHz), in particular, for example, 6.78 MHz representing one of the ISM bands.

The receiving circuit 21 includes the resonance modulation circuit 23, a rectifier circuit 24, a capacitor C22, a voltage detection circuit 25, and the transmission-signal control circuit 26.

The resonance modulation circuit 23 includes switching elements Q20P and Q20N, and capacitors C20P, C20N, and C21. The receiving coil 20 and the capacitors C20P, C20N, and C21 constitute the receiving resonant circuit 29. The capacitors C20P, C20N, and C21 each represent an example of "resonant capacitor" according to the present disclosure. When the switching elements Q20P and Q20N are in off-state, the resonant frequency of the receiving resonant circuit 29 is determined mainly by the capacitance of the capacitor C21 and the inductance of the receiving coil 20. When the switching elements Q20P and Q20N are in on-state, the resonant frequency of the receiving resonant circuit 29 is determined mainly by the parallel combined capacitance of the capacitors C20P, C20N, and C21, and the inductance of the receiving coil 20.

The rectifier circuit 24 rectifies the resonant voltage of the receiving resonant circuit 29, and the capacitor C22 smoothes the resulting rectified voltage. The voltage detection circuit 25 detects the output voltage of the receiving circuit 21 (the voltage supplied to the load circuit 22). The transmission-signal control circuit 26 switches the states of the switching elements Q20P and Q20N. This causes switching of the resonant frequencies of the receiving resonant circuit 29. Now, letting f1 be the resonant frequency when the switching elements Q20P and Q20N are in off-state, and f2 be the resonant frequency when the switching elements Q20P and Q20N are in on-state, f1±f2. Circuit constants are set such that the frequency f1 or the frequency f2 is equal to the resonant frequency f0 of the transmitting resonant circuit 19.

With the relationship between above-mentioned frequencies set as f0=f1±F2, when the switching elements Q20P and Q20N are in off-state, that is, when the resonant frequency of the resonance modulation circuit 23 is f1, the imaginary part of the input impedance at the operating frequency of the transmitting circuit is near zero, with the magnitude of the input impedance being near local minimum, and the transmitting resonant circuit 19 and the receiving resonant circuit 29 are electromagnetically coupled. Thus, the electromagnetic resonance condition is established. When the switching elements Q20P and Q20N are in on-state, that is, when the resonant frequency of the receiving resonant circuit 29 is f2, the imaginary part of the input impedance at the operating frequency of the transmitting circuit greatly differs from near zero, with the magnitude of the input impedance deviating far from near local minimum. Consequently, the transmitting resonant circuit 19 and the receiving resonant circuit 29 are not capacitively coupled, and the electromagnetic resonance condition is not established. As described above, whether the electromagnetic resonance condition is established is determined by whether the switching elements Q20P and Q20N are in on- or off-state.

In the transmitting circuit 11, the amount of current supplied from the input power source E varies in accordance with whether the electromagnetic resonance condition is established. When electromagnetic resonance is established, a greater amount of energy is supplied from the transmitting resonant circuit 19 to the receiving resonant circuit 29 than when no electromagnetic resonance is established. That is, when electromagnetic resonance is established, a greater amount of current is supplied from the input power source E to the transmitting circuit 11 than when no electromagnetic resonance is established.

The control circuit 12 reads the voltage dropped across the current detection resistor R1 to determine whether the above-mentioned electromagnetic resonance is established.

Through the above-mentioned operation, the receiver 201 transmits predetermined information (transmission signal) to the transmitter 101. For example, a case is considered in which, in accordance with the result of detection by the voltage detection circuit 25, the transmission-signal control circuit 26 transmits, to the wireless power transmitter 101, information related to the voltage supplied to the load. In this case, the control circuit 12 of the transmitter 101 demodulates the information related to the voltage supplied to the load, and controls, for example, the duty ratio of the switching circuits Q11 and Q12 such that the voltage supplied to the load becomes constant. The control circuit 12 includes "demodulator circuit" according to the present disclosure.

Figure 2:
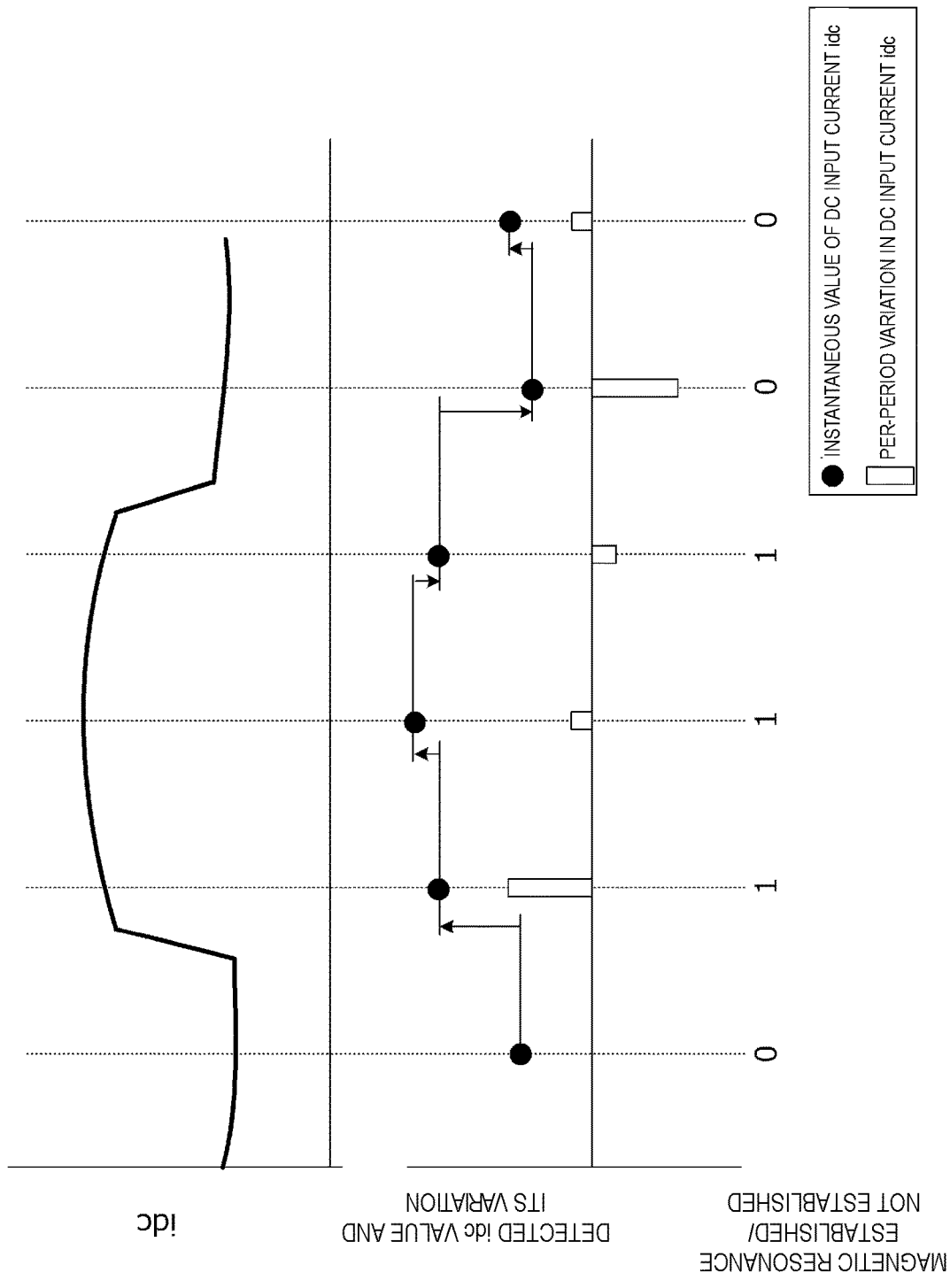
FIG. 2 illustrates the relationship between establishment/non-establishment of an electromagnetic resonance condition and variation in DC input current idc.

FIG. 2 illustrates the relationship between establishment/non-establishment of an electromagnetic resonance condition and variation in DC input current idc. The vertical dashed lines in FIG. 2 represent sampling timing. Since the DC input current idc is current supplied from the input power source E to the transmitting circuit 11, this current varies more greatly when the electromagnetic resonance condition is established than when the electromagnetic resonance condition is not established. In FIG. 2, the state value 0/1 indicative of "establishment/non-establishment of an electromagnetic resonance condition" does not represent the detection result but is illustrated for convenience of description.

Figure 3:
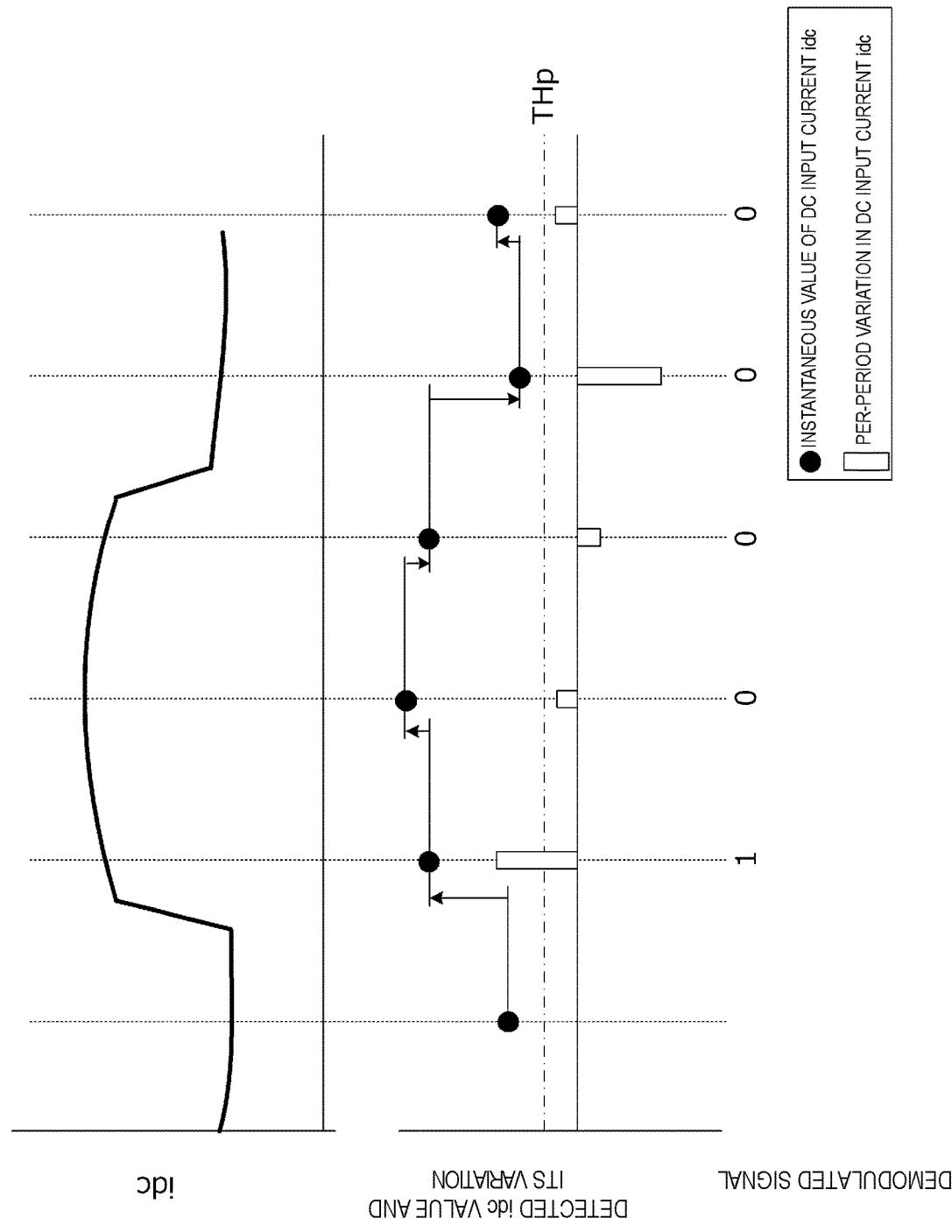
FIG. 3 illustrates exemplary signal demodulation performed by a control circuit illustrated in FIG. 1.

FIG. 3 illustrates exemplary signal demodulation performed by the control circuit 12 illustrated in FIG. 1. In FIG. 3, a threshold THp is a threshold with which to compare the amount of variation in DC input current idc. The control circuit 12 illustrated in FIG. 1 reads the value of DC input current idc at predetermined sampling intervals, detects the amount of variation in this value from the previous reading, and compares the amount of variation and the threshold THp to determine which value is larger or smaller than the other. In the example illustrated in FIG. 3, "1" represents when the amount of variation in DC input current idc in the positive direction exceeds the threshold THp, and "0" represents when this amount of variation does not exceed the threshold THp.

Figure 4:
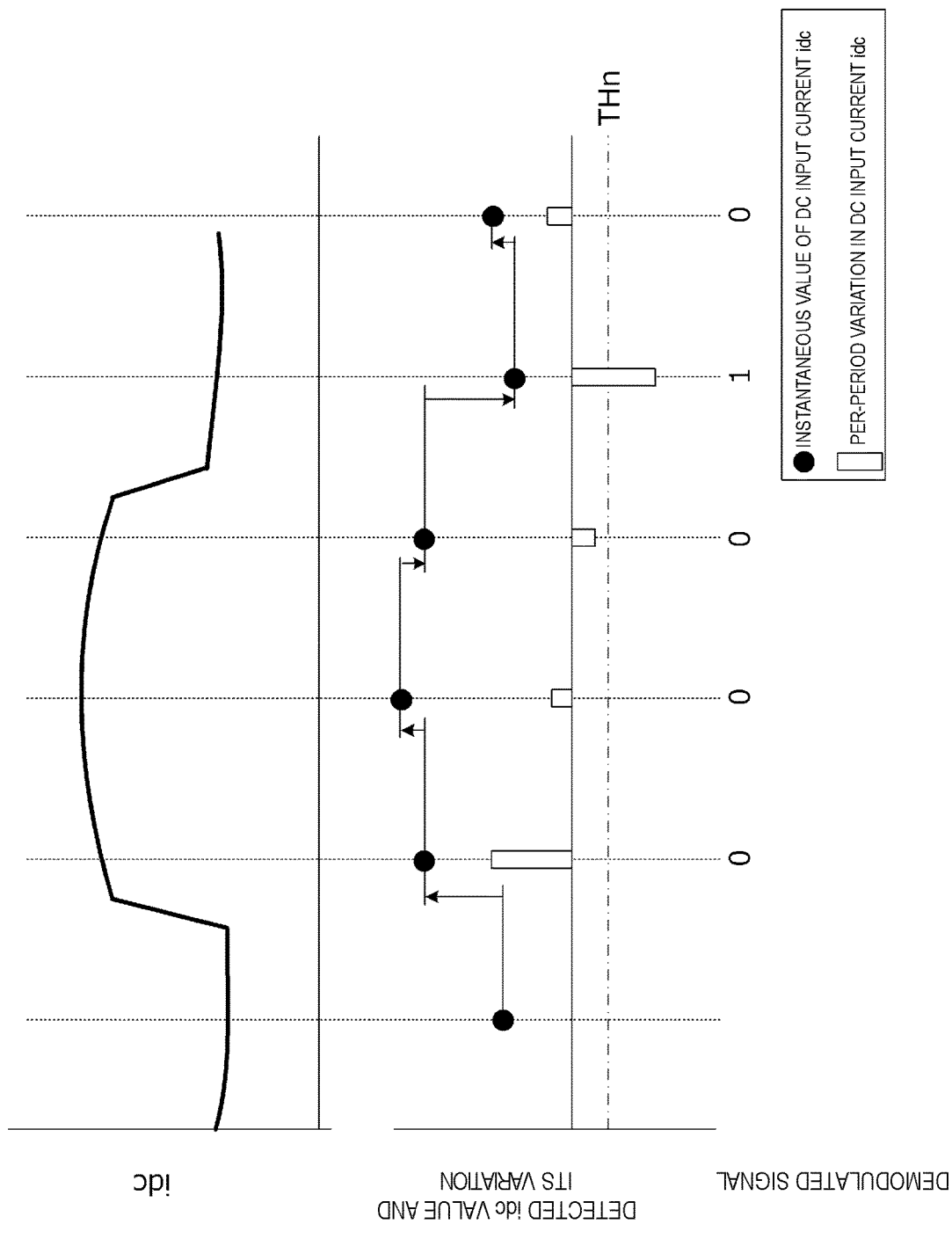
FIG. 4 illustrates another exemplary signal demodulation performed by a control circuit illustrated in FIG. 1.

FIG. 4 illustrates another exemplary signal demodulation performed by the control circuit 12 illustrated in FIG. 1. In FIG. 4, a threshold THn is a threshold with which to compare the amount of variation in DC input current idc. The control circuit 12 illustrated in FIG. 1 reads the value of DC input current idc at predetermined sampling intervals, detects the amount of variation in this value from the previous reading, and compares the amount of variation and the threshold THn to determine which value is larger or smaller than the other. In the example illustrated in FIG. 4, "1" represents when the amount of variation in DC input current idc in the negative direction exceeds the threshold THn (when the absolute value of the DC input current idc exceeds the absolute value of the threshold THn), and "0" represents when this amount of variation does not exceed the threshold THn.

Next, exemplary processing performed by the transmitter 101 and the receiver 201 illustrated in FIG. 1 will be described below with reference to a flowchart.

Figure 5:
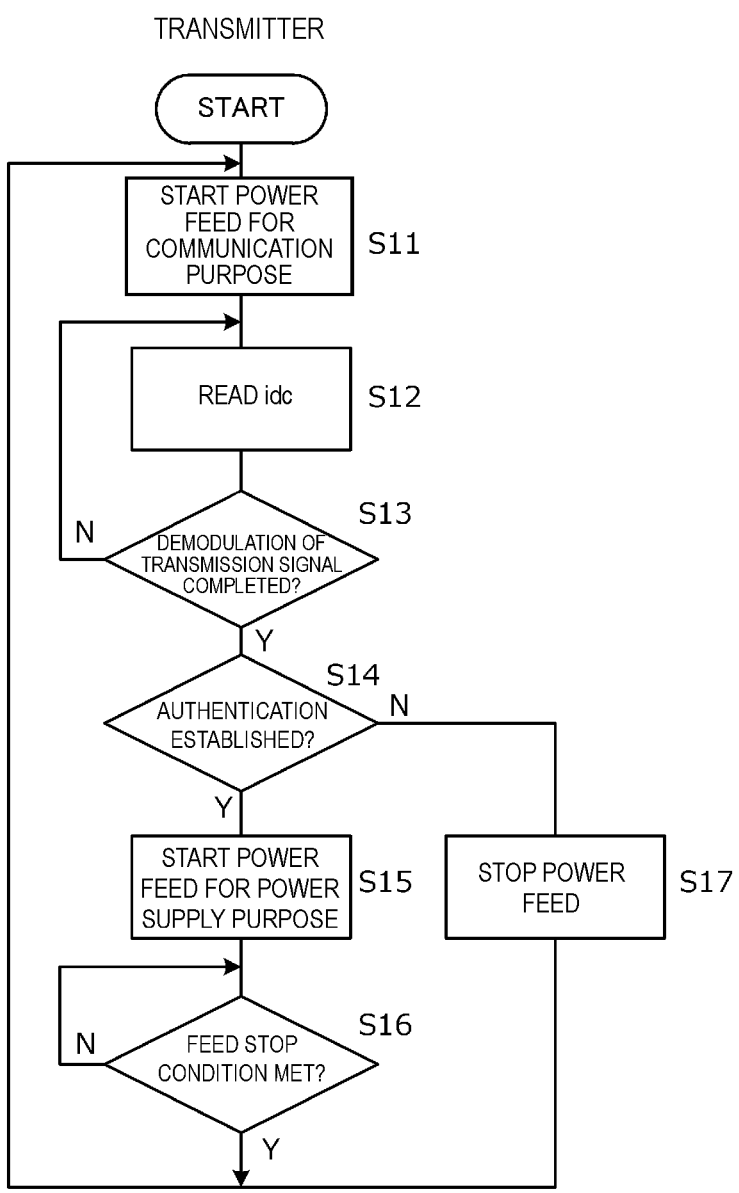
FIG. 5 is a flowchart illustrating processing performed by a control circuit of a transmitter.

FIG. 5 is a flowchart illustrating processing performed by the control circuit 12 of the transmitter 101. First, to receive some transmission signal from the receiver 201, the control circuit 12 starts power feed for the purpose of communication (S11). The power fed for the purpose of communication at this time is lower than the power fed for the purpose of normal power supply. In this state, the control circuit 12 reads the amount of DC input current idc detected (the voltage dropped across the current detection resistor R1). A more detailed description of step S12 will be given later.

When demodulation of the transmission signal is completed, the control circuit 12 determines whether authentication is established (S13→S14). As will be described later, when the receiver 201 starts to operate upon receiving power fed from the wireless power transmitter 101, the receiver 201 transmits a predetermined authentication code. The transmitter 101 receives this authentication code, and if the received code is not a specified code (if authentication is not established), power feed is stopped (S14→S17). If the received code is a specified code (if authentication is established), power feed for the purpose of normal power supply is started (S15). Thereafter, until a feed stop condition is met, the power feed for the purpose of power supply is continued (S16).

Figure 6:
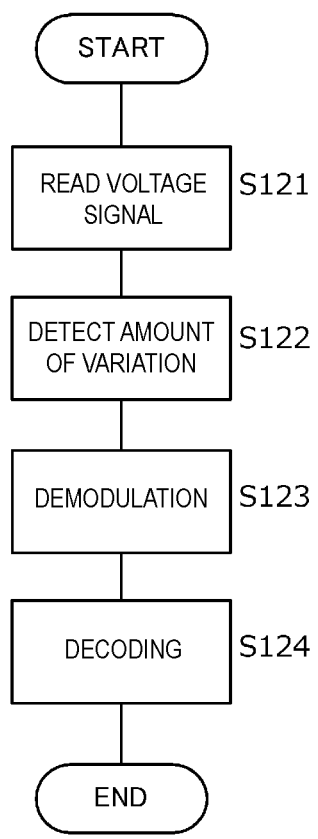
FIG. 6 is a flowchart illustrating a process (idc reading) performed in a READ idc step illustrated in FIG. 5.

FIG. 6 is a flowchart illustrating a process (idc reading) performed at step S12 illustrated in FIG. 5. First, the voltage dropped across the current detection resistor R1 is read by using an A/D converter or other devices (S121). This voltage represents an example of "variable" according to the present disclosure. Subsequently, an amount of variation representing the difference between the current and previous values of the variable is detected (S122). The amount of variation and a predetermined threshold are compared to determine which value is larger or smaller than the other, in other words, binarization is performed to demodulate the transmission signal (S123). Then, the transmission signal is decoded into a code with a predetermined number of bits. As for the above-mentioned "predetermined threshold", if the input voltage to the A/D converter is within a range of 0 V or more and less than 3.3 V (i.e., from 0 V to 3.3 V), the predetermined threshold corresponds to a predetermined value within the voltage range, for example, 1.5 V.

Figure 7:
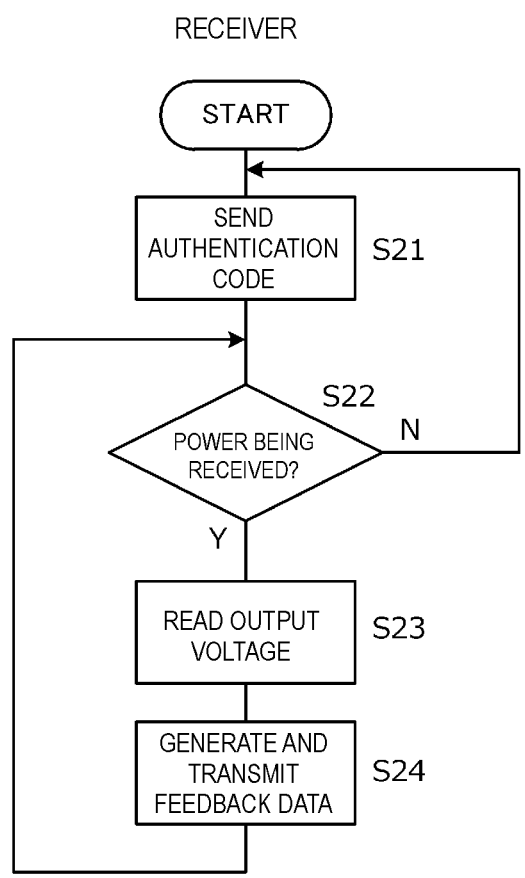
FIG. 7 is a flowchart illustrating processing performed by a transmission-signal control circuit of a receiver.

FIG. 7 is a flowchart illustrating processing performed by the transmission-signal control circuit 26 of the receiver 201. When a power supply voltage greater than or equal to a specified value is applied to the transmission-signal control circuit 26 upon reception of power, the transmission-signal control circuit 26 starts to operate. First, the transmission-signal control circuit 26 sends a predetermined authentication code (S21). As described above, the authentication code is a predetermined code used to determine whether pairing with the transmitter is possible. If authentication is established, the transmission-signal control circuit 26 waits for normal power supply from the transmitter (S21→S22).

When the normal power supply from the transmitter is started, the transmission-signal control circuit 26 reads an output voltage, generates feedback data such that the output voltage is kept at a specified value, and transmits the feedback data to the transmitter (S23→S24). The transmitter 101 receives this feedback data, and appropriately adjusts the power to be supplied. Steps S23 and S24 mentioned above are repeated to stabilize received power.

Figure 8:
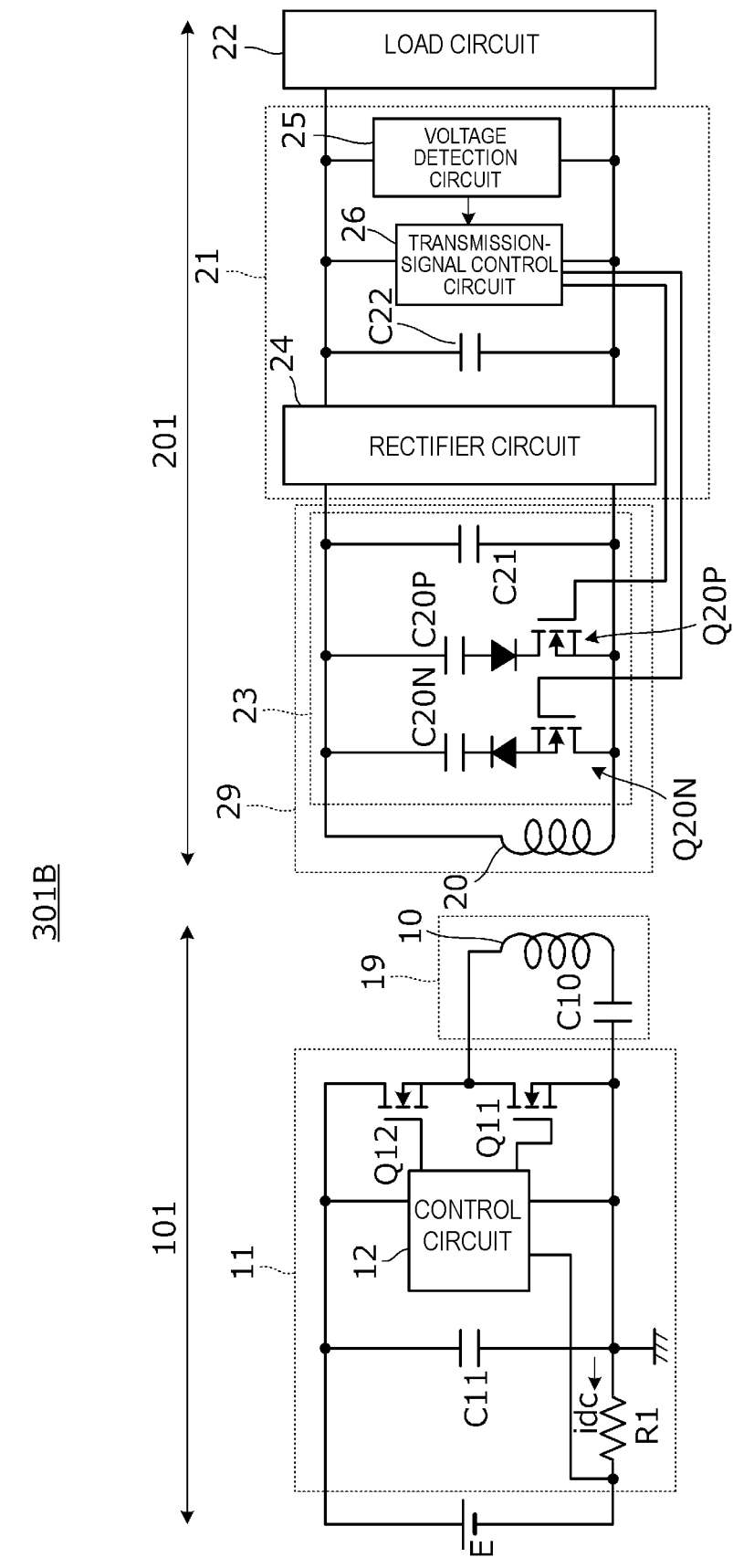
FIG. 8 is a circuit diagram of another wireless power feeding system according to the first embodiment.

FIG. 8 is a circuit diagram of another wireless power feeding system according to the first embodiment.

A wireless power feeding system 301B includes the transmitter 101 and the receiver 201. The transmitter 101 in FIG. 8 differs from the transmitter 101 in FIG. 1 in the location of the current detection resistor R1. Otherwise, the configuration in FIG. 8 is identical to the configuration in FIG. 1.

As illustrated in FIG. 8, the current detection resistor R1 may be inserted in the ground line, and the voltage dropped across the current detection resistor R1 may be read.

According to the first embodiment, a predetermined transmission signal is transmitted based on changes in whether the electromagnetic resonance condition is established. This enables highly stable signal transmission from the receiver to the transmitter, substantially without dependence on the state of resonant coupling between the transmitter and the receiver or other factors.

Second Embodiment

The following description of a second embodiment will be directed to a wireless power feeding system that demodulates a transmission signal based on a quantity related to a resonant voltage generated in the resonant circuit including the transmitting coil.

Figure 9:
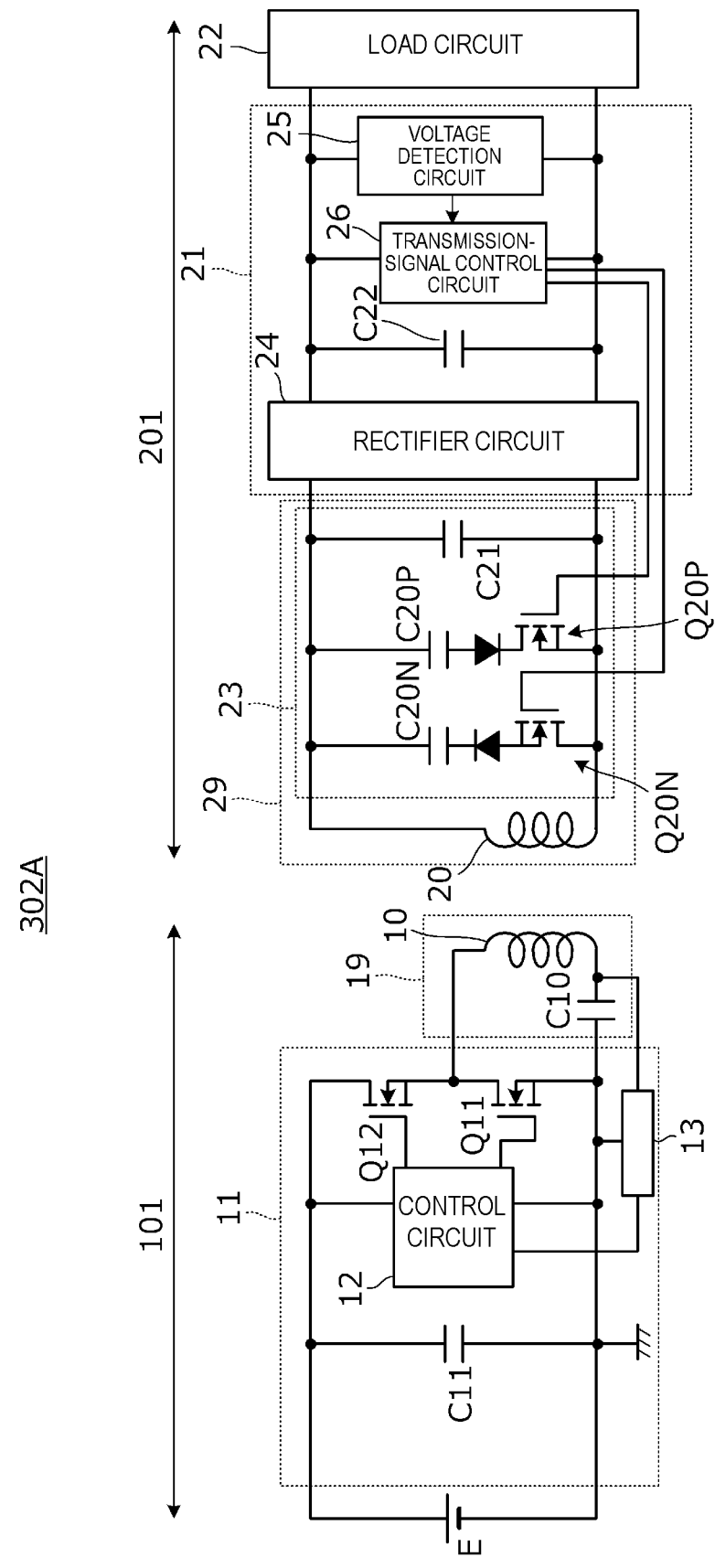
FIG. 9 is a circuit diagram according to a second embodiment, illustrating a wireless power transmitter, a wireless power receiver, and a wireless power feeding system including the wireless power transmitter and the wireless power receiver.

FIG. 9 is a circuit diagram according to the second embodiment, illustrating a wireless power transmitter, a wireless power receiver, and a wireless power feeding system including the wireless power transmitter and the wireless power receiver.

A wireless power feeding system 302A includes the transmitter 101 and the receiver 201. The transmitter 101 includes the transmitting coil 10, and the transmitting circuit 11 that supplies high-frequency power to the transmitting coil 10. The receiver 201 includes the receiving coil 20 that electromagnetically couples to the transmitting coil 10, the receiving circuit 21 that converts high-frequency power received by the receiving coil 20 into DC power, and the load circuit 22 that consumes the DC power.

The transmitting circuit 11 includes a resonant-voltage detection circuit 13. The resonant-voltage detection circuit 13 detects the resonant voltage of a resonant circuit formed by the transmitting coil 10 and the capacitor C10, and converts the detected resonant voltage into a DC voltage proportional to the resonant voltage. The control circuit 12 reads this DC voltage. In the second embodiment, this DC voltage represents a variable that varies in accordance with whether the electromagnetic resonance condition is established.

Otherwise, the wireless power feeding system 302A is identical in configuration to the wireless power feeding system 301A or 301B according to the first embodiment illustrated in FIG. 1.

The resonant voltage of the transmitting resonant circuit 19 formed by the transmitting coil 10 and the capacitor C10 varies more greatly when electromagnetic resonance is established than when electromagnetic resonance is not established. The control circuit 12 compares the resonant voltage with a predetermined threshold to determine whether the electromagnetic resonance is established.

As in the second embodiment, the resonant voltage of the transmitting resonant circuit 19 may be taken as a variable that varies in accordance with whether the electromagnetic resonance condition is established, and a transmission signal may be demodulated based on this variable.

Figure 10:
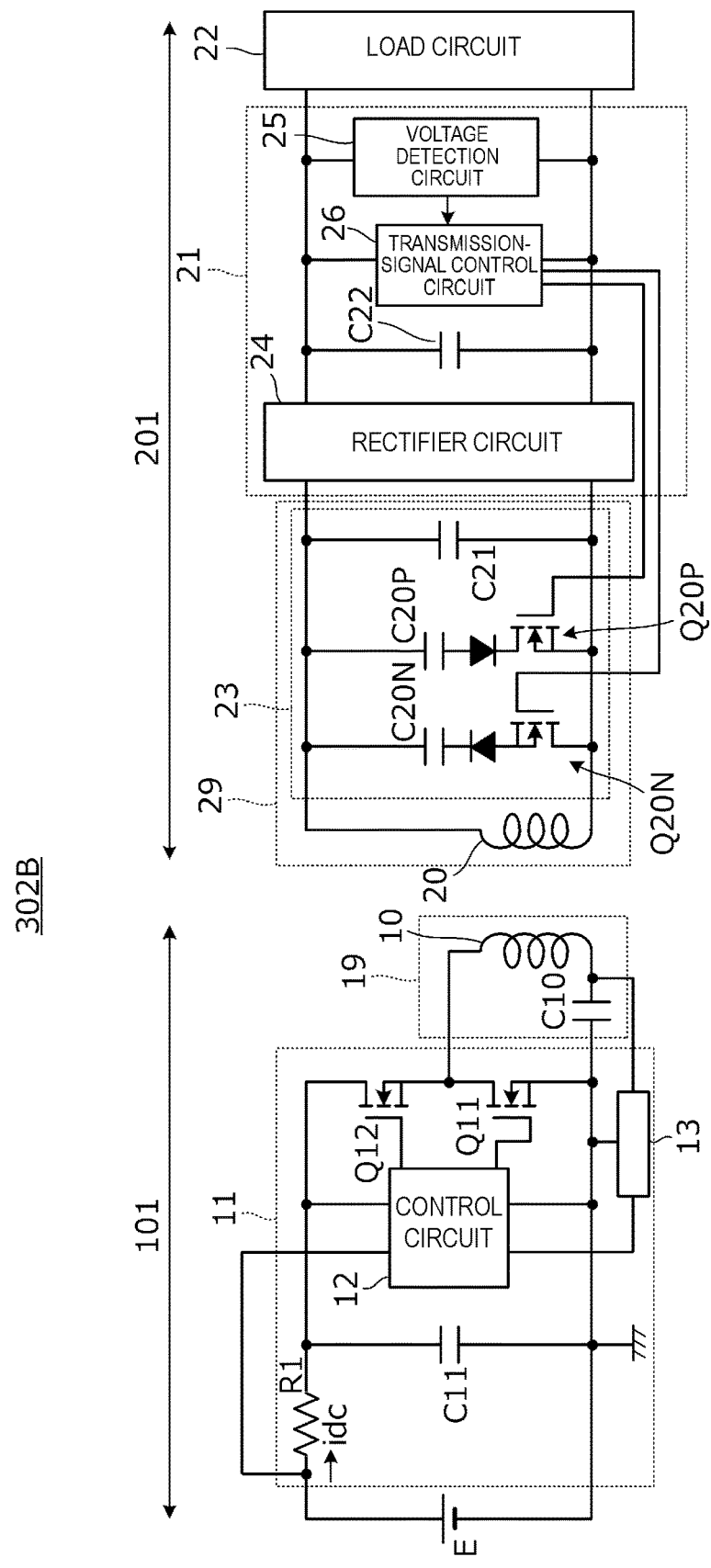
FIG. 10 is a circuit diagram of another wireless power feeding system according to the second embodiment.

In another example, a transmission signal may be demodulated as follows. That is, the resonant voltage of the resonant circuit is taken as a first variable that varies in accordance with whether the electromagnetic resonance condition is established. Further, as described above with reference to the first embodiment, the DC input current supplied from the input power source E to the transmitting circuit 11 is taken as a second variable that varies in accordance with whether the electromagnetic resonance condition is established. A transmission signal is demodulated based on both the first and second variables. FIG. 10 is a circuit diagram of another wireless power feeding system according to the second embodiment, illustrating the above-mentioned example.

A wireless power feeding system 302B includes the transmitter 101 and the receiver 201. As opposed to the transmitter 101 in FIG. 9, the transmitter 101 in FIG. 10 further includes a current detection circuit formed by the current detection resistor R1. Otherwise, the configuration of the wireless power feeding system 302B is identical to the configuration illustrated in each of FIG. 1 and FIG. 9.

As described above, whether the electromagnetic resonance condition is established may be determined based on the input current (first variable) and the resonant voltage (second variable). For example, the logical product of a binarized value of the first variable and a binarized value of the second variable may be taken as the demodulation result. This helps reduce the influence of noise or other interferences for enhanced accuracy of demodulation. Further, if the logical sum of a binarized value of the first variable and a binarized value of the second variable is taken as the demodulation result, this substantially increases the sensitivity with which a transmission signal is received.

As described above, whether to detect both input current and resonant voltage or detect only one of input current and resonant voltage can be also switched in accordance with the state. This helps increase the accuracy of state determination.

Third Embodiment

A third embodiment represents an example of a wireless power feeding system that performs demodulation through comparison of two thresholds with the amount of variation in a variable that varies in accordance with whether the electromagnetic resonance condition is established.

The circuit diagram of the wireless power feeding system according to the third embodiment is identical to the circuit diagram according to the first embodiment illustrated in FIG. 1.

Figure 11:
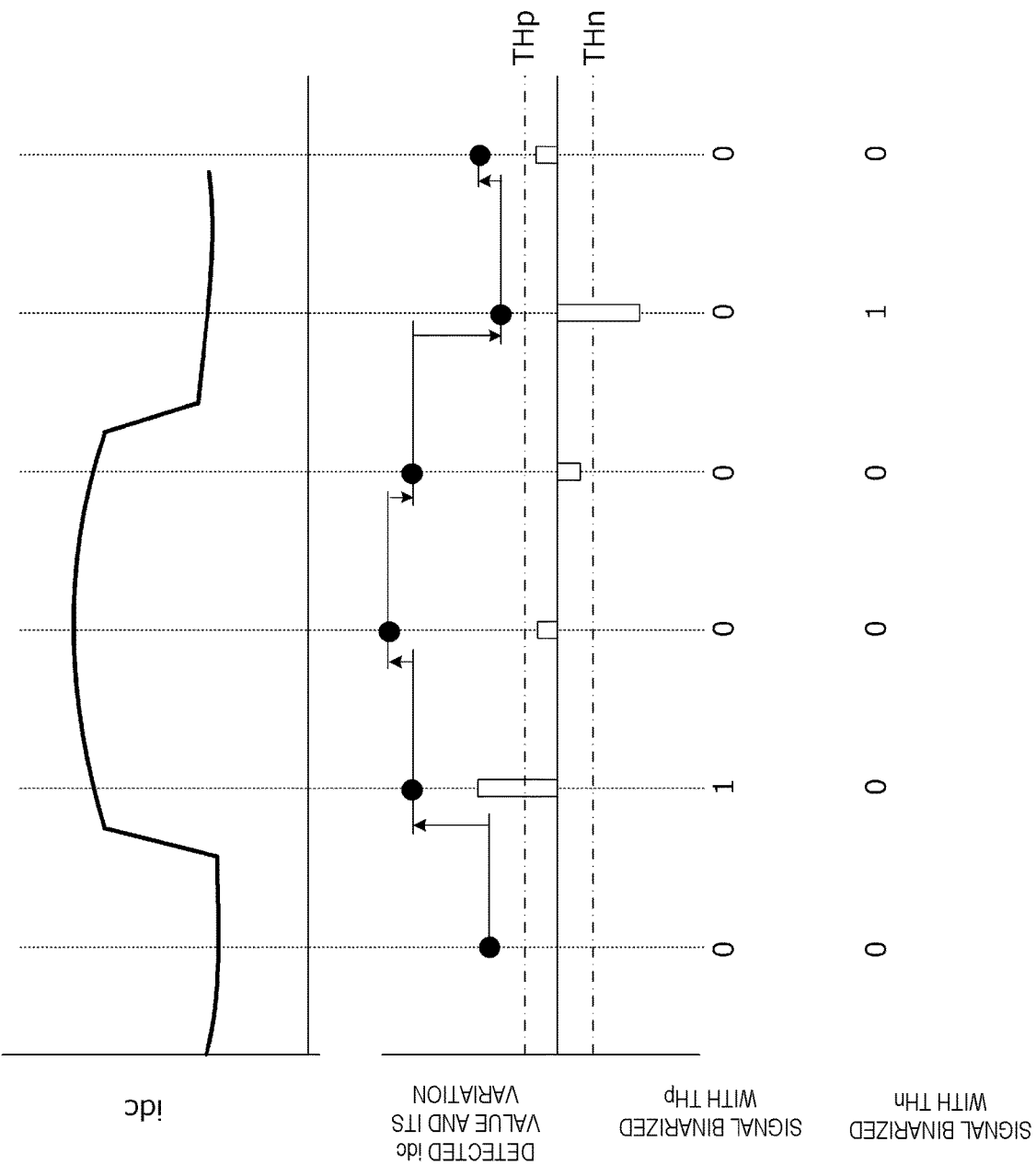
FIG. 11 illustrates the relationship between establishment/non-establishment of an electromagnetic resonance condition and variation in DC input current idc in a wireless power transmitter according to a third embodiment.

FIG. 11 illustrates the relationship between establishment/non-establishment of an electromagnetic resonance condition and variation in DC input current idc. The vertical dashed lines in FIG. 11 represent sampling timing. Since the DC input current idc is a current supplied from the input power source E to the transmitting circuit 11, its value is greater when electromagnetic resonant coupling is established than when electromagnetic resonant coupling is not established. In FIG. 11, "signal binarized with THp" represents the result of comparison between the amount of variation in DC input current per period and the first threshold THp. Further, "signal binarized with THn" represents the result of comparison between the amount of variation in DC input current per period and the second threshold THn.

In the third embodiment, the control circuit 12 illustrated in FIG. 1 demodulates a transmission signal based on the two binarized signals mentioned above. FIG. 12 illustrates an example of this demodulation process. In FIG. 12, "first data" corresponds to "signal binarized with the first threshold THp" represented as 6-bit data, and "second data" corresponds to "signal binarized with the second threshold THn" represented as 6-bit data. In the present case, the logical sum of the first data and the second data is calculated as demodulated data.

According to the third embodiment, the change from establishment to non-establishment of the electromagnetic resonance condition and the change from non-establishment to establishment of electromagnetic resonance condition can both carry one bit of information. This helps increase transfer rate for a transmission signal.

Fourth Embodiment

The following description of a fourth embodiment will be directed to a wireless power feeding system with a resonance modulation circuit that differs in configuration from the first embodiment.

Figure 13:
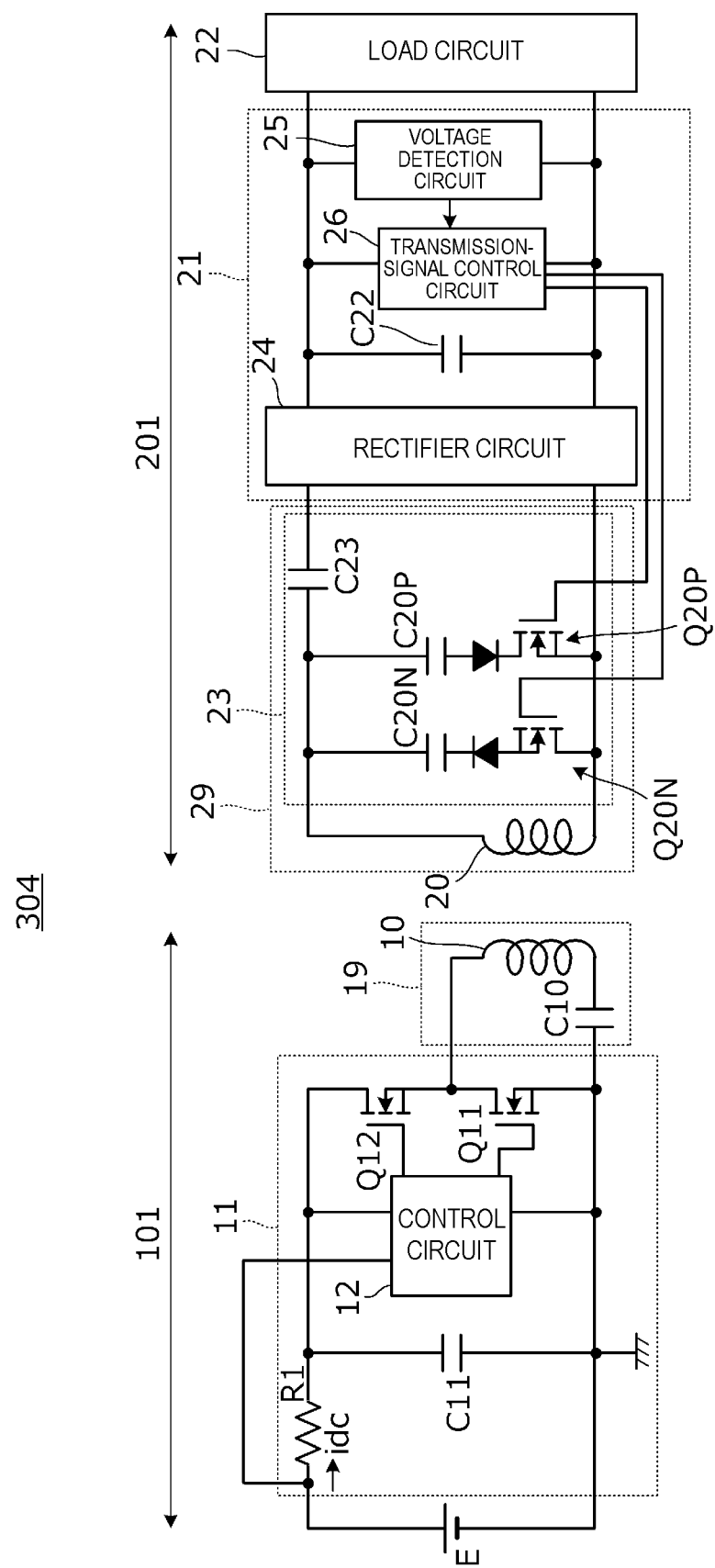
FIG. 13 is a circuit diagram of a wireless power feeding system according to a fourth embodiment.

FIG. 13 is a circuit diagram of a wireless power feeding system 304 according to the fourth embodiment. The wireless power feeding system 304 differs from the wireless power feeding system 301A illustrated in FIG. 1 in the configuration of the resonance modulation circuit 23 of the receiver 201. The resonance modulation circuit 23 of the wireless power feeding system 304 includes the switching elements Q20P and Q20N, and the capacitors C20P and C20N and a capacitor C23. The receiving coil 20, the capacitors C20P, C20N, and C23, and the switching elements Q20P and Q20N constitute the resonance modulation circuit. The capacitors C20P, C2ON, and C23 each represent an example of "resonant capacitor" according to the present disclosure. A resonant current flows through the capacitor C23 via the rectifier circuit 24. When the switching elements Q20P and Q20N are in off-state, the resonant frequency is determined mainly by the capacitance of the capacitor C23 and the inductance of the receiving coil 20. When the switching elements Q20P and Q20N are in on-state, the resonant frequency is determined mainly by the parallel combined capacitance of the capacitors C20P, C20N, and C23, and the inductance of the receiving coil 20.

As in the fourth embodiment, one or more (the capacitor C23) of the resonant capacitors constituting the resonance modulation circuit 23 may be connected in series with the rectifier circuit.

Fifth Embodiment

With reference to a fifth embodiment, several exemplary implementations of the rectifier circuit included in the receiver will be described.

Figure 14A:
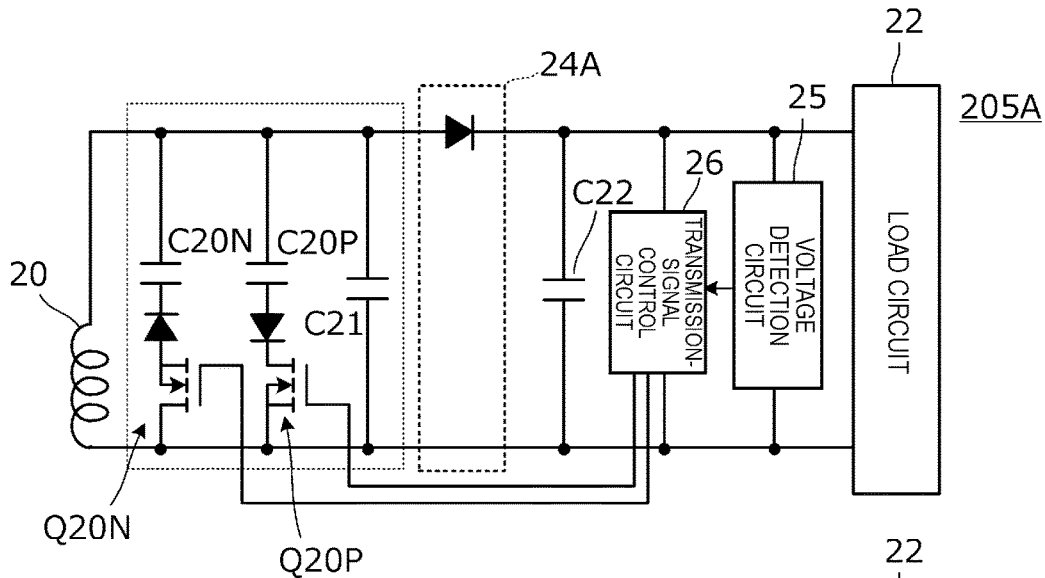
FIG. 14A is a circuit diagram of a receiver according to a fifth embodiment.
Figure 14B:
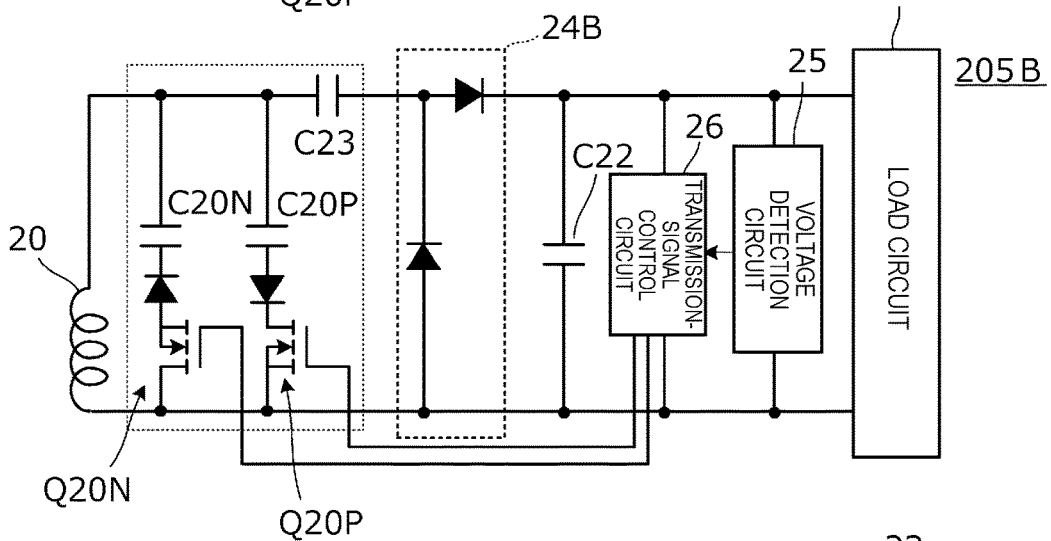
FIG. 14B is a circuit diagram of a receiver according to the fifth embodiment.
Figure 14C:
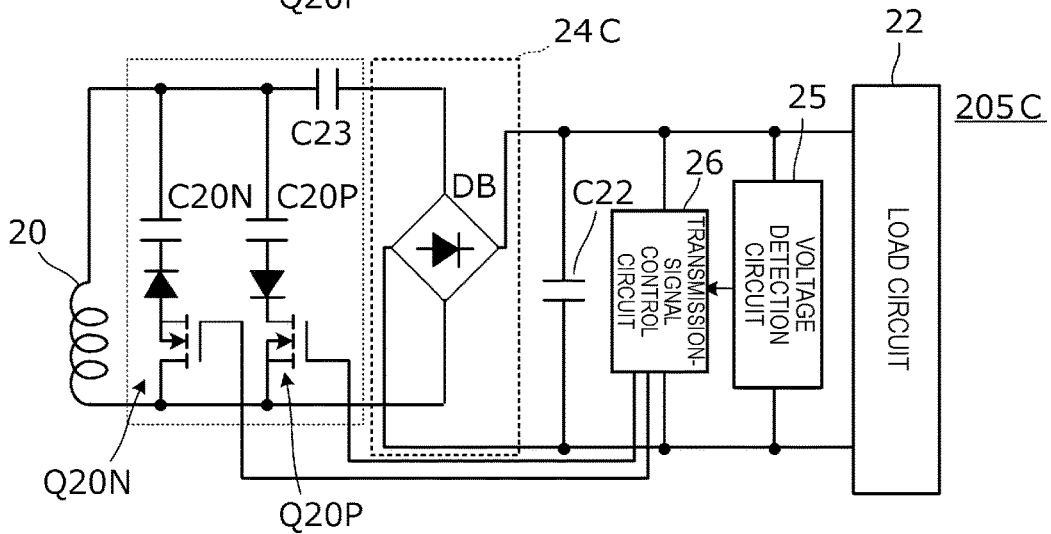
FIG. 14C is a circuit diagram of a receiver according to the fifth embodiment.

FIG. 14A is a circuit diagram of a receiver 205A according to the fifth embodiment, FIG. 14B is a circuit diagram of a receiver 205B according to the fifth embodiment, and FIG. 14C is a circuit diagram of a receiver 205C according to the fifth embodiment.

Figure 15A:
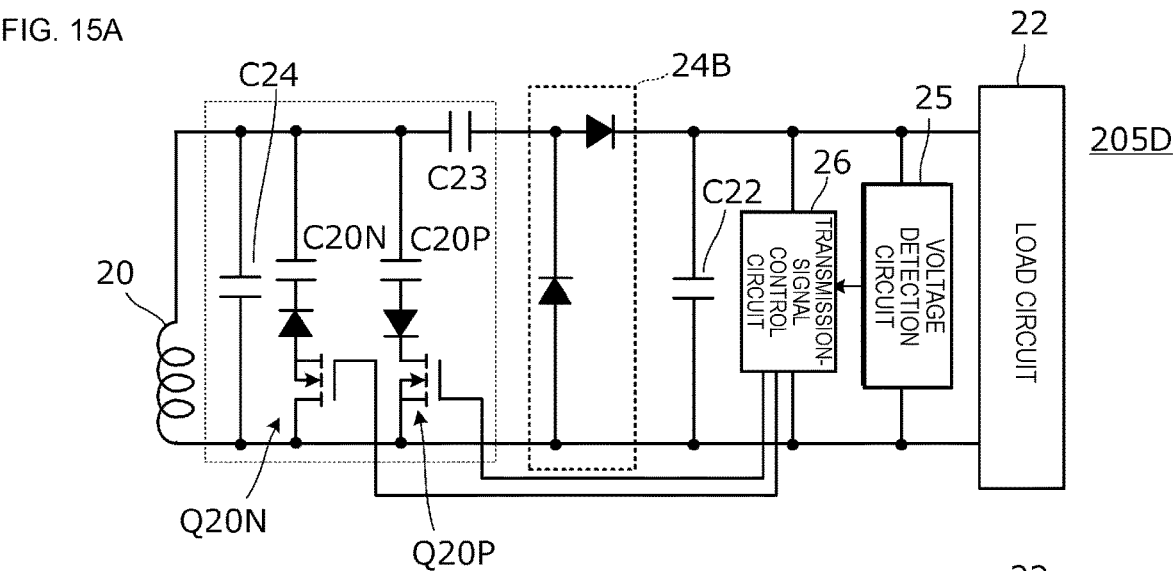
FIG. 15A is a circuit diagram of a receiver according to the fifth embodiment.
Figure 15B:
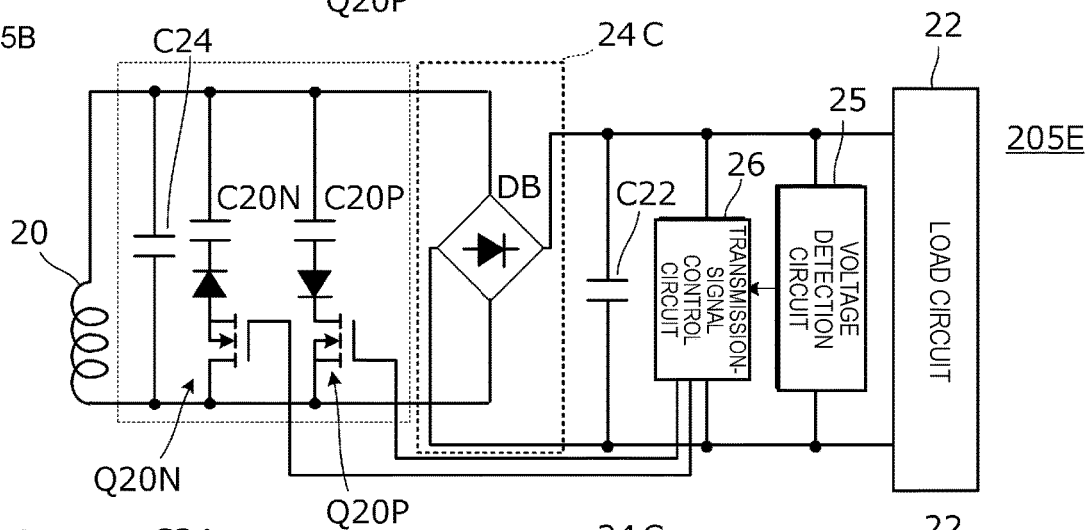
FIG. 15B is a circuit diagram of a receiver according to the fifth embodiment.
Figure 15C:
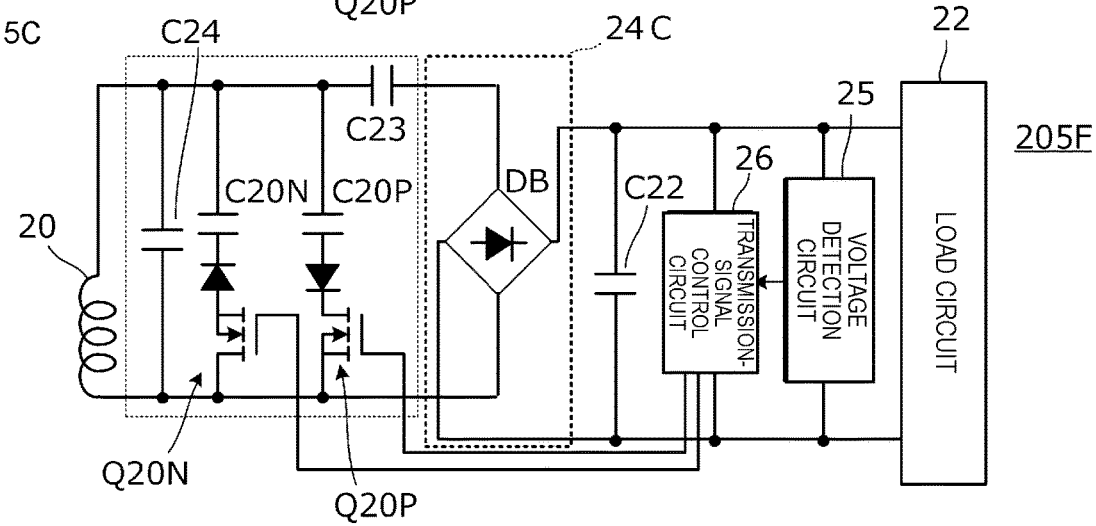
FIG. 15C is a circuit diagram of a receiver according to the fifth embodiment.

FIG. 15A is a circuit diagram of a receiver 205D according to the fifth embodiment, FIG. 15B is a circuit diagram of a receiver 205E according to the fifth embodiment, and FIG. 15C is a circuit diagram of a receiver 205F according to the fifth embodiment.

In FIG. 14A, FIG. 14B, FIG. 14C, FIG. 15A, FIG. 15B, and FIG. 15C, a rectifier circuit 24A is a half-wave rectifier circuit using a diode D1, a rectifier circuit 24B is a voltage-doubler rectifier circuit using diodes D1 and D2, and a rectifier circuit 24C is a full-wave rectifier circuit using a diode bridge DB.

As described above with reference to the fifth embodiment, the receiver may be provided with various kinds of rectifier circuits. If the receiver includes a half-wave rectifier circuit as with the receiver 205A, the resonant capacitors C20P and C20N, and the resonant capacitor C21 are preferably connected in parallel with the receiving coil 20 so that resonant current flows for each wave. If the receiver is provided with a voltage-doubler rectifier circuit as with the receiver 205B, or if the receiver is provided with a full-wave rectifier circuit as with the receiver 205C, the resonant current of each wave flows through the rectifier circuit. Accordingly, of the resonant capacitors C20P and C20N and the resonant capacitor C23, the resonant capacitor C23 may be connected in series with the receiving coil 20.

As with the receivers 205D, 205E, and 205F, a resonant capacitor C24 may be connected in parallel with the receiving coil 20.

Although the foregoing description of each embodiment is directed to a case in which a variable capacitance circuit is implemented as a circuit formed by a connection of capacitors and switching circuits, such a variable capacitance circuit may be implemented as a circuit including variable capacitance elements whose capacitance varies with control voltage.

Although the foregoing description of each embodiment is directed to a case in which the transmitter is dedicated to power transmission and the receiver is dedicated to power reception, if both the transmitter and the receiver include a transmitting circuit and a receiving circuit, feeding of power and transmitting and receiving of a transmission signal can be performed bidirectionally.

Lastly, the foregoing description of the embodiments is illustrative in all respects and not limitative. Various modifications and variations can be made to the embodiments as appropriate by persons skilled in the art. The scope of the present disclosure is defined not by the above-mentioned embodiments but by the appended claims. Further, the scope of the disclosure is intended to cover all variations that may fall within the scope of the appended claims and their equivalents.

What is claimed is:

1. A wireless power feeding system comprising:
   a transmitter comprising:
      a transmitting resonant circuit including a transmitting coil, and
      a transmitting circuit configured to supply high-frequency power to the transmitting resonant circuit; and
   a receiver comprising:
      a receiving resonant circuit including a receiving coil, the receiving resonant circuit being configured to magnetically couple to the transmitting resonant circuit;
      a receiving circuit configured to convert high-frequency power received by the receiving resonant circuit into direct-current power;
      a load circuit configured to consume the direct-current power;
      a resonance modulation circuit configured to vary an input impedance to switch whether an electromagnetic resonance condition is established, the input impedance being an impedance viewed toward the load circuit from the transmitting circuit, and the electromagnetic resonance condition being a condition for electromagnetic resonance to be established by electromagnetic coupling between the transmitting resonant circuit and the receiving resonant circuit; and
      a transmission-signal control circuit configured to convert a transmission signal into a variation pattern to control the resonance modulation circuit, the variation pattern representing a pattern of variation in an electrical signal per predetermined time period with respect to temporal variation of the input impedance; and
   wherein the transmitter further comprises a demodulator circuit configured to detect a respective value of a variable at respective sampling intervals and perform demodulation of the transmission signal, the variable varying in accordance with whether the electromagnetic resonance condition is established, and the demodulation being performed based on a variation pattern representing a pattern of variation per predetermined time period with respect to temporal variation of the variable, such that when a change between the value of the variable detected at one of the respective sampling intervals and the value of the variable at a preceding one of the respective sampling intervals exceeds a predetermined threshold, the demodulator circuit performs the demodulation of the transmission signal, and when the change between the value of the variable detected at the one of the respective sampling intervals and the value of the variable at the preceding one of the respective sampling intervals fails to exceed the predetermined threshold, the demodulator circuit refrains from performing the demodulation of the transmission signal.

2. The wireless power feeding system according to claim 1, wherein the electromagnetic resonance condition comprises a condition in which an imaginary part of the input impedance at an operating frequency of the transmitting circuit is near zero and a magnitude of the input impedance is near local minimum.

3. The wireless power feeding system according to claim 1, wherein the demodulator circuit is configured to perform the demodulation by comparison of the variable with a threshold.

4. The wireless power feeding system according to claim 3, wherein the variable comprises a quantity related to a current flowing through the transmitting circuit.

5. The wireless power feeding system according to claim 3, wherein the variable comprises a quantity related to a resonant voltage generated in the transmitting resonant circuit.

6. The wireless power feeding system according to claim 3, wherein the variable comprises a quantity related to a current flowing through the transmitting circuit, and a quantity related to a resonant voltage generated in the transmitting resonant circuit.

7. The wireless power feeding system according to claim 3, wherein the demodulator circuit is configured to perform the demodulation by comparison of the variable with a first threshold and a second threshold, the first threshold being used to detect a variation in the variable in a positive direction, and the second threshold being used to detect a variation in the variable in a negative direction.

8. The wireless power feeding system according to claim 1, wherein
the receiving resonant circuit has a resonant capacitor configured to resonate together with the receiving coil, and
the resonance modulation circuit has a variable capacitance circuit configured to vary a capacitance of the resonant capacitor.

9. The wireless power feeding system according to claim 8, wherein the variable capacitance circuit comprises a circuit formed by a connection of a capacitor and a switching circuit.

10. The wireless power feeding system according to claim 9, wherein the switching circuit comprises a circuit including a semiconductor transistor.

11. The wireless power feeding system according to claim 2, wherein the demodulator circuit is configured to perform the demodulation by comparison of the variable with a threshold.

12. The wireless power feeding system according to claim 4, wherein the demodulator circuit is configured to perform the demodulation by comparison of the variable with a first threshold and a second threshold, the first threshold being used to detect a variation in the variable in a positive direction, and the second threshold being used to detect a variation in the variable in a negative direction.

13. The wireless power feeding system according to claim 5, wherein the demodulator circuit is configured to perform the demodulation by comparison of the variable with a first threshold and a second threshold, the first threshold being used to detect a variation in the variable in a positive direction, and the second threshold being used to detect a variation in the variable in a negative direction.

14. The wireless power feeding system according to claim 6, wherein the demodulator circuit is configured to perform the demodulation by comparison of the variable with a first threshold and a second threshold, the first threshold being used to detect a variation in the variable in a positive direction, and the second threshold being used to detect a variation in the variable in a negative direction.

15. The wireless power feeding system according to claim 2, wherein
the receiving resonant circuit has a resonant capacitor configured to resonate together with the receiving coil, and
the resonance modulation circuit has a variable capacitance circuit configured to vary a capacitance of the resonant capacitor.

16. The wireless power feeding system according to claim 3, wherein
the receiving resonant circuit has a resonant capacitor configured to resonate together with the receiving coil, and
the resonance modulation circuit has a variable capacitance circuit configured to vary a capacitance of the resonant capacitor.

17. The wireless power feeding system according to claim 4, wherein
the receiving resonant circuit has a resonant capacitor configured to resonate together with the receiving coil, and
the resonance modulation circuit has a variable capacitance circuit configured to vary a capacitance of the resonant capacitor.

18. The wireless power feeding system according to claim 5, wherein
the receiving resonant circuit has a resonant capacitor configured to resonate together with the receiving coil, and
the resonance modulation circuit has a variable capacitance circuit configured to vary a capacitance of the resonant capacitor.

19. A wireless power transmitter that constitutes a wireless power feeding system together with a wireless power receiver,
the wireless power receiver comprising:
a receiving resonant circuit configured to electromagnetically coupling to a transmitting resonant circuit included in the wireless power transmitter;
a receiving circuit configured to convert high-frequency power received by the receiving resonant circuit into direct-current power;
a load circuit configured to consume the direct-current power;
a resonance modulation circuit configured to vary an input impedance to switch whether an electromagnetic resonance condition is established, the input impedance being an impedance viewed toward the load circuit from a transmitting circuit included in the transmitting resonant circuit, the electromagnetic resonance condition being a condition for electromagnetic resonance to be established by electromagnetic coupling between the transmitting resonant circuit and the receiving resonant circuit; and
a transmission-signal control circuit configured to convert a transmission signal into a variation pattern to control the resonance modulation circuit, the variation pattern representing a pattern of variation per predetermined time period with respect to temporal variation of the input impedance; and
the wireless power transmitter comprising:
a transmitting circuit configured to supply high-frequency power to the transmitting resonant circuit; and
a demodulator circuit configured to detect a respective value of a variable at respective sampling intervals and perform demodulation of the transmission signal, the variable varying in accordance with whether the electromagnetic resonance condition is established, and the demodulation being performed based on a variation pattern representing a pattern of variation per predetermined time period with respect to temporal variation of the variable, such that when a change between the value of the variable detected at one of the respective sampling intervals and the value of the variable at a preceding one of the respective sampling intervals exceeds a predetermined threshold, the demodulator circuit performs the demodulation of the transmission signal, and when the change between the value of the variable detected at the one of the respective sampling intervals and the value of the variable at the preceding one of the respective sampling intervals fails to exceed the predetermined threshold, the demodulator circuit refrains from performing the demodulation of the transmission signal.

20. A wireless power receiver that constitutes a wireless power feeding system together with a wireless power transmitter,
the wireless power transmitter comprising:

a transmitting resonant circuit configured to electromagnetically coupling to a receiving resonant circuit included in the wireless power receiver;

a transmitting circuit configured to supply high-frequency power to the transmitting resonant circuit; and a demodulator circuit configured to detect a respective value of a variable at respective sampling intervals and perform demodulation of a transmission signal, the variable varying in accordance with whether an electromagnetic resonance condition is established, the electromagnetic resonance condition being a condition for electromagnetic resonance to be established by electromagnetic coupling between the transmitting resonant circuit and the receiving resonant circuit, and the demodulation being performed based on a variation pattern representing a pattern of variation per predetermined time period with respect to temporal variation of the variable, such that when a change between the value of the variable detected at one of the respective sampling intervals and the value of the variable at a preceding one of the respective sampling intervals exceeds a predetermined threshold, the demodulator circuit performs the demodulation of the transmission signal, and when the change between the value of the variable detected at the one of the respective sampling intervals and the value of the variable at the preceding one of the respective sampling intervals fails to exceed the predetermined threshold, the demodulator circuit refrains from performing the demodulation of the transmission signal; and the wireless power receiver comprising:

a receiving circuit configured to convert high-frequency power received by the receiving resonant circuit into direct-current power;

a load circuit configured to consume the direct-current power;

a resonance modulation circuit configured to vary an input impedance to switch whether the electromagnetic resonance condition is established, the input impedance being an impedance viewed toward the load circuit from the transmitting circuit included in the transmitting resonant circuit; and a transmission-signal control circuit configured to convert a transmission signal into a variation pattern to control the resonance modulation circuit, the variation pattern representing a pattern of variation per predetermined time period with respect to temporal variation of the input impedance.

* * * * *